(12) United States Patent
Ramb et al.

(10) Patent No.: US 9,494,045 B2
(45) Date of Patent: Nov. 15, 2016

(54) EXHAUST-GAS TURBOCHARGER

(75) Inventors: Thomas Ramb, Worms (DE); Nico Kanoffsky, Bolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 522 days.

(21) Appl. No.: 14/235,548

(22) PCT Filed: Aug. 2, 2012

(86) PCT No.: PCT/US2012/049246
§ 371 (c)(1),
(2), (4) Date: Jan. 28, 2014

(87) PCT Pub. No.: WO2013/022683
PCT Pub. Date: Feb. 14, 2013

(65) Prior Publication Data
US 2014/0154056 A1  Jun. 5, 2014

(30) Foreign Application Priority Data

Aug. 8, 2011 (DE) .......... 10 2011 109 739

(51) Int. Cl.
*F01D 17/12* (2006.01)
*F16B 9/02* (2006.01)
*F02B 37/18* (2006.01)
*F02B 37/24* (2006.01)

(52) U.S. Cl.
CPC ............ *F01D 17/12* (2013.01); *F02B 37/186* (2013.01); *F16B 9/02* (2013.01); *F02B 37/24* (2013.01); *Y02T 10/144* (2013.01); *Y10T 403/7007* (2015.01)

(58) Field of Classification Search
CPC ................... F01D 17/12; F02B 37/186; F02B 37/24; F16B 9/02; Y02T 10/144; Y10T 407/7007
See application file for complete search history.

(56) References Cited

U.S. PATENT DOCUMENTS

| 4,770,603 | A | * | 9/1988 | Engels | .................... | F01D 5/141 |
| | | | | | | 415/147 |
| 4,804,316 | A | * | 2/1989 | Fleury | .................. | F01D 17/165 |
| | | | | | | 415/134 |
| 6,405,535 | B1 | * | 6/2002 | McEwan | ............... | F01D 17/105 |
| | | | | | | 251/62 |
| 6,662,708 | B2 | * | 12/2003 | Hosny | .................... | F01B 17/00 |
| | | | | | | 92/101 |

(Continued)

Primary Examiner — Igor Kershteyn
(74) Attorney, Agent, or Firm — A. Michael Tucker; Stephen A. Pendorf; Patent Central LLC

(57) ABSTRACT

An exhaust-gas turbocharger (1) having a turbine (2) which is provided with a variable turbine geometry (18) and/or a wastegate; and having an actuator (11) which is connected to the variable turbine geometry (18) and/or the wastegate via a coupling rod (14; 14'; 14"). The coupling rod (14; 14') is connected at its end regions (21, 22) at one side to the actuator (11) and at the other side to a pin (19) of an adjusting shaft arrangement (23; 26) of the variable turbine geometry (18) and/or of the wastegate. The pin (19) of the adjusting shaft arrangement (23; 26) is in the form of a bayonet pin, and that end region (22) of the coupling rod (14) which interacts with the pin (19) is in the form of a bayonet receptacle (24; 27) which is matched to the bayonet pin (19).

6 Claims, 4 Drawing Sheets

(56) References Cited

U.S. PATENT DOCUMENTS

Figure 1:
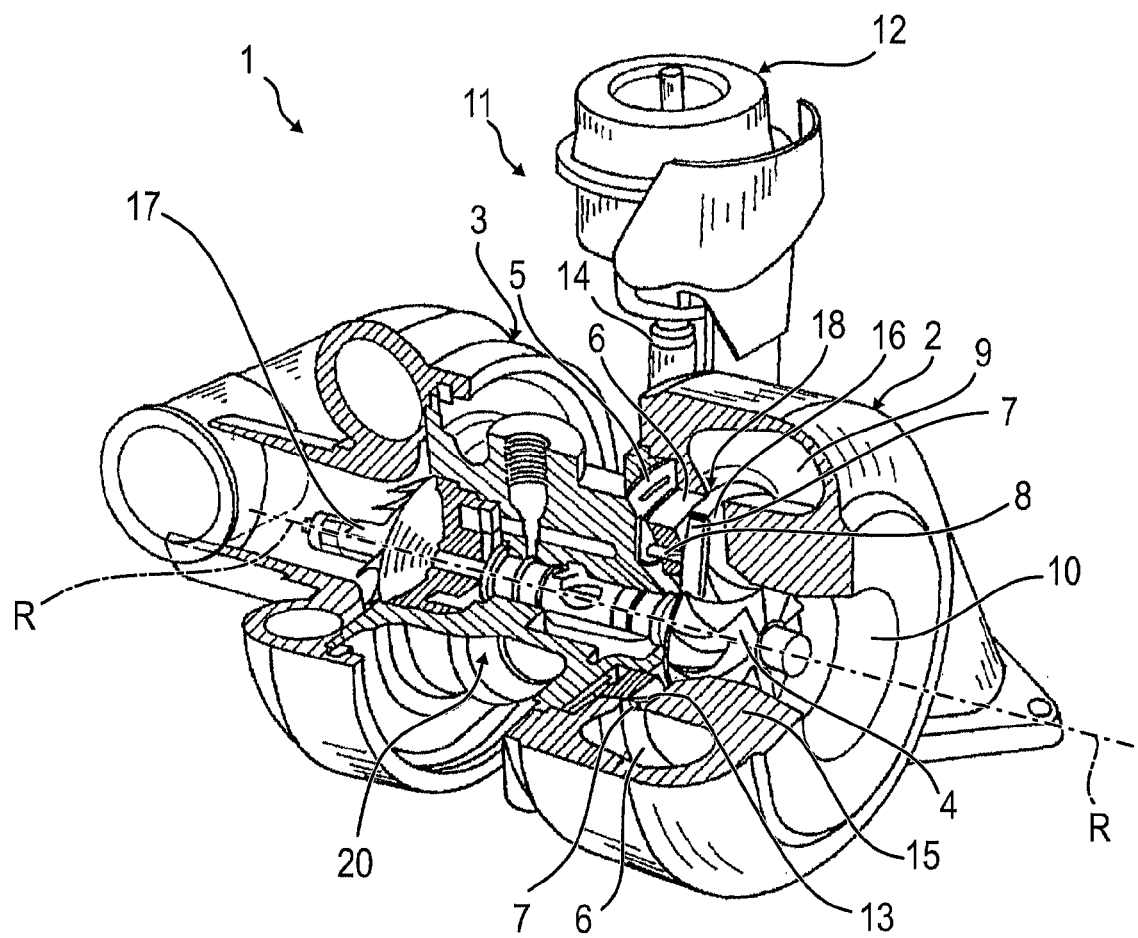

| | | | | |
|---|---|---|---|---|
| 6,669,442 B2* | 12/2003 | Jinnai | ................... | F01D 17/165 |
| | | | | 29/889.2 |
| 6,994,518 B2* | 2/2006 | Simon | ................... | F01D 17/141 |
| | | | | 415/147 |
| 8,100,639 B2* | 1/2012 | Genin | ..................... | F01D 17/20 |
| | | | | 415/144 |
| 8,678,755 B2* | 3/2014 | Lombard | ................ | F01D 9/026 |
| | | | | 415/145 |
| 8,992,164 B2* | 3/2015 | Ramb | ................... | F01D 17/165 |
| | | | | 415/155 |
| 2003/0185672 A1* | 10/2003 | Suganami | ............ | H02K 7/1166 |
| | | | | 415/150 |

* cited by examiner

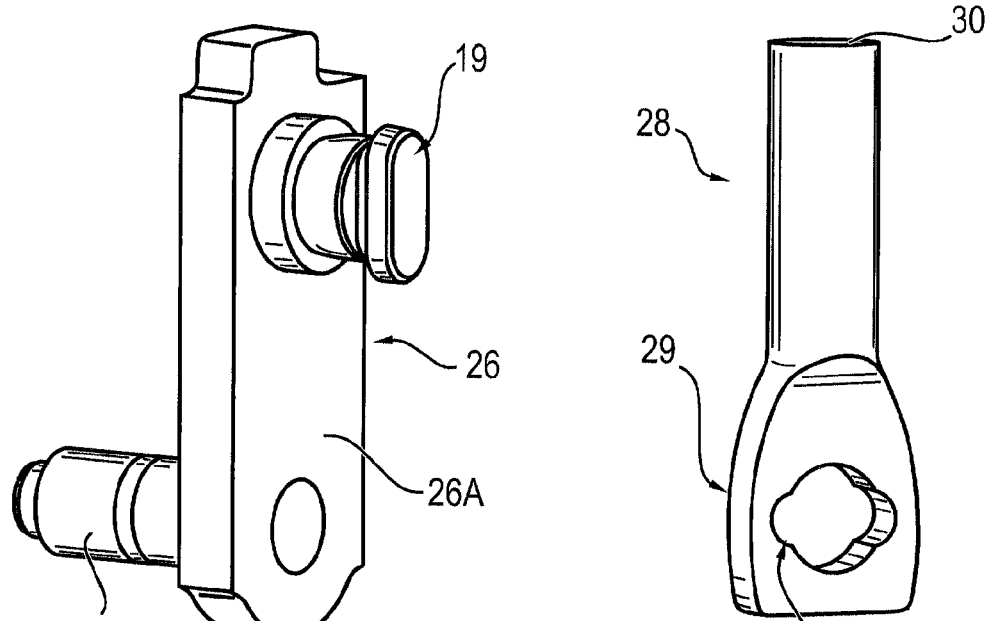
FIG. 7
FIG. 8
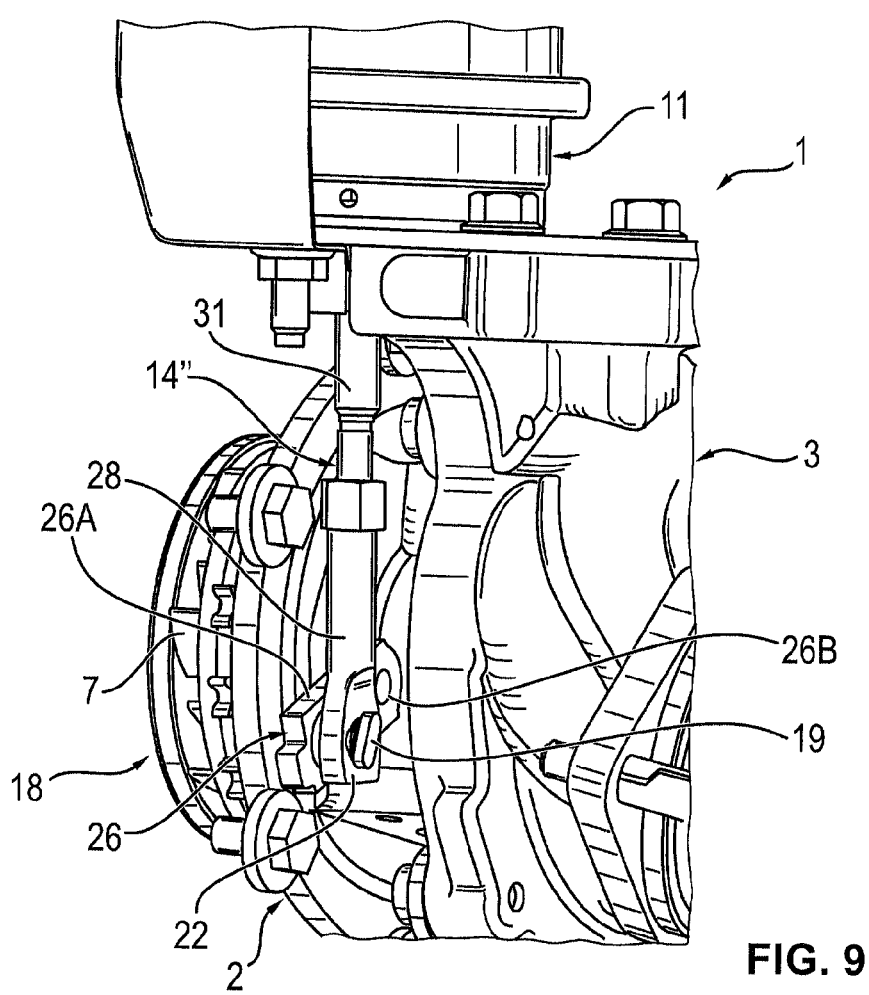
FIG. 9

EXHAUST-GAS TURBOCHARGER

The invention relates to an exhaust-gas turbocharger.

An exhaust-gas turbocharger of said type is known from DE 10 2008 053 079 A1. In said known design, a coupling rod connects the actuator (for example an electric actuator or a pneumatic control capsule) to the assembly of an adjusting shaft of a variable turbine geometry (VTG), also referred to as a guide grate. Here, the coupling rod transmits the movement generated by the actuator to the VTG. Instead of a VTG or in addition to the VTG, the use of a coupling rod is also possible in the case of an exhaust-gas turbocharger with a wastegate, which constitutes a turbine bypass. Here, the coupling rod is mounted on a pin assigned to the actuator and on a pin assigned to the adjusting shaft and is secured by means of a lock washer. The known lock washers have the disadvantage, however, that as a result of the difficult mounting process, the clipping thereof to the pin diameter cannot be ensured in a reliable manner in terms of a process.

It is therefore an object of the present invention to provide an exhaust-gas turbocharger which permits simpler mounting of its coupling rod between the actuator and variable turbine geometry (VTG) and/or wastegate.

Figure 4:
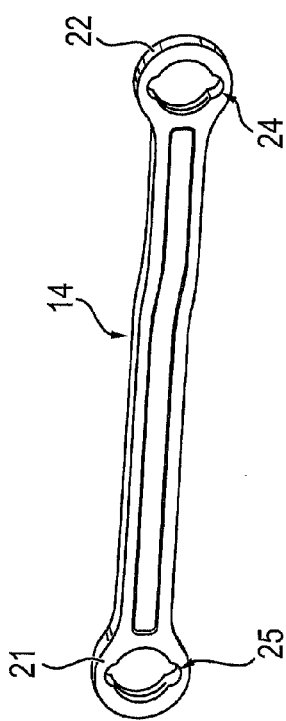
Figure 5:
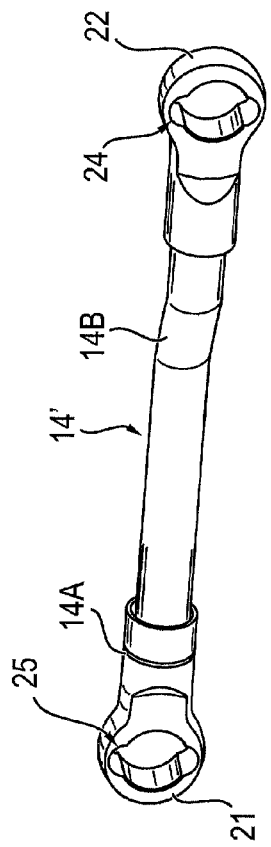
Figure 2:
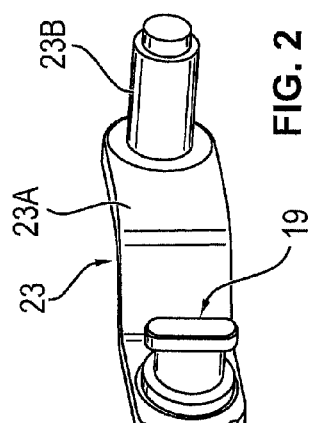
Figure 3:
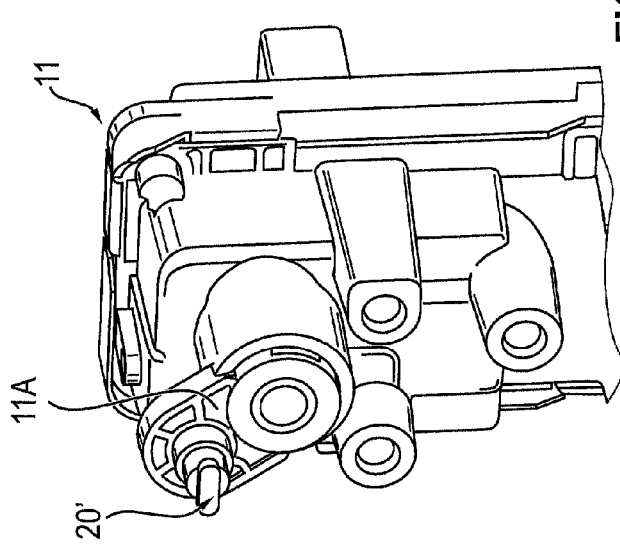
Figure 6:
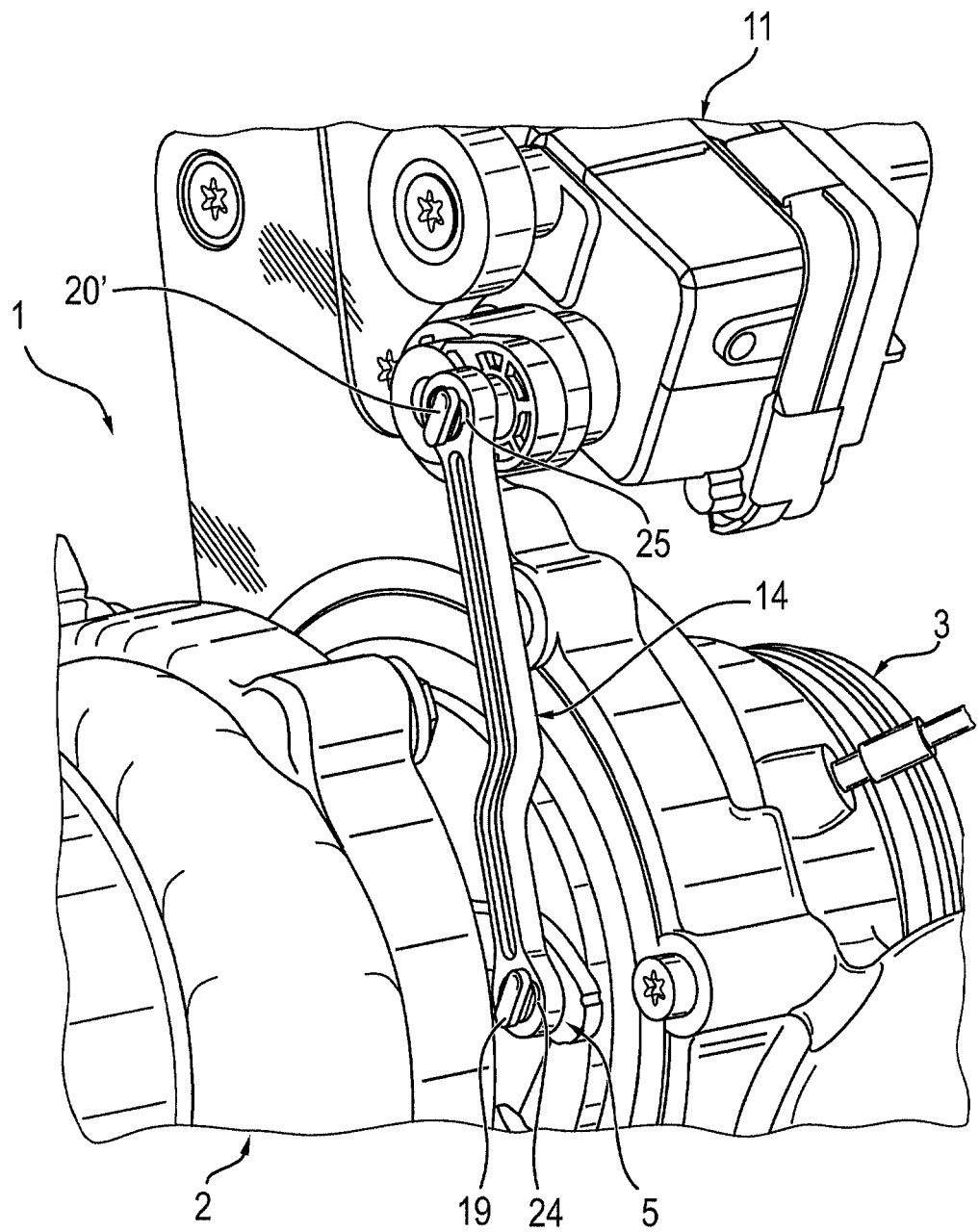

Further details, features and advantages of the invention will emerge from the following description of an exemplary embodiment on the basis of the drawing, in which:

FIG. 1 shows a perspective, partially sectional illustration of an exhaust-gas turbocharger according to the invention, FIG. 2 shows a perspective view of an adjusting shaft arrangement, FIG. 3 shows a perspective arrangement of an actuator, FIGS. 4 and 5 show perspective illustrations of two embodiments of a coupling rod, FIG. 6 shows the coupling rod as per FIG. 4 in the installed state between an actuator and a variable turbine geometry, FIG. 7 shows an illustration, corresponding to FIG. 2, of a further embodiment of an adjustable arrangement, FIG. 8 shows a perspective illustration of a guide piece with a bayonet receptacle, and FIG. 9 shows a partial view of an exhaust-gas turbocharger according to the invention with installed guide piece.

FIG. 1 shows a perspective view, illustrated partially in section, of a turbocharger according to the invention. The turbocharger 1 has a turbine housing 2 and has a compressor housing 3 which is connected to said turbine housing via a bearing housing 20. The housings 2, 3 and 20 are arranged along an axis of rotation R. The turbine housing 2 is shown partially in section in order to illustrate the arrangement of a blade bearing ring 6 and a radially outer guide grate formed by said blade bearing ring, or a variable turbine geometry 18, which has a multiplicity of adjustable blades 7 which are distributed about the circumference and which have rotary shafts 8. In this way, nozzle cross sections are formed which, depending on the position of the adjustable blades 7, become larger or smaller and supply a greater or lesser amount of the exhaust gas of an engine, which is supplied via a supply duct 9 and discharged via a central connecting piece 10, to the turbine wheel 4 which is situated in the center on the axis of rotation R, in order, by means of the turbine wheel 4, to drive a compressor wheel 17 which is seated on the same shaft.

To control the movement or the position of the adjustable blades 7, an actuating device or an actuator 11 is provided which may for example be in the form of an electric actuator or pneumatic control capsule. In the embodiment illustrated, the actuating device 11 has a control housing 12 and a coupling rod 14 in order to transmit the movement thereof to an adjusting ring 5 situated behind the blade bearing ring 6, said movement being converted into a slight rotational movement of said adjusting ring. Between the blade bearing ring 6 and an annular part 15 of the turbine housing 2 there is formed a free space 13 for the adjustable blades 7. To be able to safeguard said free space 13, the blade bearing ring 6 has spacers 16. The free space for the adjustable blades 7 is delimited in the upward direction above the spacers 16 by a receiving disk 19.

FIG. 2 shows a perspective illustration of an adjusting shaft arrangement 23 which has a lever 23A, which lever is of cranked design in the example and is provided, on one of its end regions, with a shaft peg 23B and, on its other shaft region, with a bayonet pin 19.

FIG. 3 shows an actuator 11 which may for example be in the form of an electric or pneumatic actuator (control capsule). Said actuator 11 likewise has a bayonet pin 20' which is attached to an actuating part 11A.

FIGS. 4 and 5 illustrate two possible embodiments of a coupling rod 14 and 14' respectively, each of which has end regions 21 and 22. The end regions are each provided with bayonet receptacles 24 and 25 which are adapted in terms of shape and dimensions to the shape and dimensions of the bayonet pins 19 and 20'. The difference between the two embodiments of the coupling rod 14 and 14' consists merely in that the coupling rod 14' is assembled from two rod parts 14A and 14B which can be joined together, as can be seen in detail from FIG. 5.

FIG. 6 shows a partial view of the turbocharger 1 according to the invention, said partial view showing the turbine housing 2 and the compressor housing 3 and also the actuator 11 and the coupling rod 14 in the assembled state. Here, FIG. 6 shows that the bayonet pin 20' of the actuator 11 engages into the bayonet receptacle 25, whereas the bayonet pin 19 of the adjusting shaft arrangement 5 engages into the bayonet receptacle 24.

For mounting, the coupling rod 14 is firstly plugged at one side, for example with its bayonet receptacle 24, onto the bayonet pin 19, and is rotated. The other bayonet receptacle, in the example the bayonet receptacle 25, is then placed onto the bayonet pin 20', wherein a rotation is again performed for locking. Subsequently, in the next assembly step, the actuator 11 can be screwed to the compressor housing 3.

The advantage of said arrangement is firstly mounting and axial locking, which are each achieved by means of the bayonet connections.

Further locking elements are not required in the arrangement according to the invention, and this results in a simplification of both production and also assembly, and therefore results in an overall cost reduction.

FIG. 7 shows a further adjusting shaft arrangement 26, which in turn has a lever 26A and a shaft peg 26B which is arranged on one end of the lever 26A. At the other end of the lever 26A there is arranged, in turn, a bayonet pin 19, which however in contrast to the embodiment of FIG. 2, in which the bayonet pin 19 and the shaft peg 23B point in the same direction, in this case points in the opposite direction, as can be seen in detail from FIG. 7. Furthermore, the lever 26A is not of cranked design.

FIG. 8 shows a guide piece 28 with an end region 29 which is provided with a bayonet receptacle 27 which is adapted in terms of shape and dimensions to the bayonet pin 19, in order to be able to form a bayonet connection with the latter, as in the embodiment described above.

FIG. 9 shows the exhaust-gas turbocharger 1 with its turbine housing 2 and the variable turbine geometry 18 and also the compressor housing 3 and the actuator 11 fixed thereto. In said embodiment, the guide piece 28 is mounted with its bayonet receptacle 27 onto the bayonet pin 19 and locked. In the second step, an actuator regulating rod 31 (control capsule regulating rod) is inserted, at its other end region 30, into a bore provided on the guide piece 28, and for example welded in order to realize final fixing.

Said embodiment, too, yields the same advantages as those described on the basis of the embodiment as per FIGS. 2 to 6.

In addition to the above written disclosure of the invention, reference is hereby explicitly made to the diagrammatic disclosure thereof in FIGS. 1 to 9.

LIST OF REFERENCE SYMBOLS

1 Exhaust-gas turbocharger
2 Turbine housing
3 Compressor housing
4 Turbine wheel
5 Adjusting ring
6 Blade bearing ring
7 Adjustable blades
8 Rotary shafts
9 Supply duct
10 Axial connecting piece
11 Actuating device/Actuator
11A Actuating part
12 Control housing
13 Free space for guide blades 7
14, 14', 14" Piston rod
14A, 14B Rod parts
15 Annular part of the turbine housing 2
16 Spacer/Spacer cam
17 Compressor wheel
18 Variable turbine geometry VTG/Guide grate
19 Bayonet pin
20 Bearing housing
20' Bayonet pin
21, 22 End regions
23 Adjusting shaft arrangement
23A Lever
23B Shaft peg
24, 25 Bayonet receptacles
26 Adjusting shaft arrangement
26A Lever
26B Shaft peg
27 Bayonet receptacle
28 Guide piece
29 First end region with bayonet receptacle
30 Second end region
31 Coupling rod
R Axis of rotation

The invention claimed is:

1. An exhaust-gas turbocharger (1) having
a turbine (2) which is provided with a variable turbine geometry (18) and/or a wastegate; and
an actuator (11) which is connected to the variable turbine geometry (18) and/or the wastegate via a coupling rod (14; 14'; 14"), wherein the coupling rod (14; 14') is connected at its end regions (21, 22) at one side to the actuator (11) and at the other side to a pin (19) of an adjusting shaft arrangement (23; 26) of the variable turbine geometry (18) and/or of the wastegate,
wherein the pin (19) of the adjusting shaft arrangement (23; 26) is in the form of a bayonet pin, and
wherein end region (22) of the coupling rod (14) which interacts with the pin (19) is in the form of a bayonet receptacle (24; 27) which is matched to the bayonet pin (19).

2. The exhaust-gas turbocharger as claimed in claim 1, wherein the actuator (11) is provided with a bayonet pin (20'), and
wherein the coupling rod (14; 14') is provided, at its two end regions (21, 22), with in each case one bayonet receptacle (24, 25), which bayonet receptacles are adapted in terms of shape and dimensions to the bayonet pins (19, 20) of the adjusting shaft arrangement (23) and of the actuator (11).

3. The exhaust-gas turbocharger as claimed in claim 1, wherein the coupling rod (14") has a guide piece (28), on the end region (29) of which the bayonet receptacle (27) is arranged, and in that the other end region (30) of the guide piece (28) is connected to an actuator regulating rod (31).

4. A coupling rod (14; 14'; 14") of an exhaust-gas turbocharger (1), wherein at least one end region (29) is equipped with a bayonet receptacle (27).

5. The coupling rod as claimed in claim 4, wherein two end regions (21, 22) are provided which are each equipped with an associated bayonet receptacle (24, 25).

6. The coupling rod as claimed in claim 4, wherein a guide piece (28) is provided, on the end region (29) of which the bayonet receptacle (27) is arranged and on the other end region (30) of which an actuator regulating rod (31) is arranged.

* * * * *